(12) United States Patent
O'Flaherty et al.

(10) Patent No.: US 9,758,408 B2
(45) Date of Patent: Sep. 12, 2017

(54) ANAEROBIC REACTOR FOR WASTEWATER TREATMENT

(75) Inventors: Vincent O'Flaherty, Moycullen (IE); Dermot Hughes, Galway (IE)

(73) Assignee: National University of Ireland, Galway, Galway (IE)

( * ) Notice: Subject to any disclaimer, the term of this patent is extended or adjusted under 35 U.S.C. 154(b) by 428 days.

(21) Appl. No.: 13/991,326

(22) PCT Filed: Dec. 6, 2011

(86) PCT No.: PCT/EP2011/071952
§ 371 (c)(1),
(2), (4) Date: Jun. 11, 2013

(87) PCT Pub. No.: WO2012/076541
PCT Pub. Date: Jun. 14, 2012

(65) Prior Publication Data
US 2013/0264283 A1    Oct. 10, 2013

(30) Foreign Application Priority Data

Dec. 6, 2010   (EP) .................................. 10193829

(51) Int. Cl.
*C02F 3/28*    (2006.01)
*C02F 3/10*    (2006.01)

(52) U.S. Cl.
CPC .............. *C02F 3/28* (2013.01); *C02F 3/107* (2013.01); *C02F 3/2806* (2013.01); *C02F 3/286* (2013.01); *C02F 2301/103* (2013.01); *Y02E 50/343* (2013.01); *Y02W 10/15* (2015.05)

(58) Field of Classification Search
CPC .... C02F 3/308; C02F 2301/103; C02F 3/286; C02F 3/10; C02F 3/28
USPC .................. 210/613, 615, 616, 906
See application file for complete search history.

(56) References Cited

U.S. PATENT DOCUMENTS 4,956,094 A *  9/1990 Levin et al. ................. 210/625
5,580,770 A   12/1996 DeFilippi
6,325,934 B1  12/2001 Tobey, Jr. et al.
2003/0057152 A1* 3/2003 Haridas ........................ 210/603

(Continued)

FOREIGN PATENT DOCUMENTS

EP        0 302 545 A2    2/1989

OTHER PUBLICATIONS

McHugh et al, "Long-term, high-rate anaerobic biological treatment of when wastewater at psychrophilic temperatures" , Biosource Technology, 97, 2005, pp. 1669-1678.*

(Continued)

*Primary Examiner* — Claire Norris
(74) *Attorney, Agent, or Firm* — Porter, Wright, Morris & Arthur, LLP (57) ABSTRACT

The present invention relates to an anaerobic reactor (10) for the treatment of industrial and other wastewaters at psychrophilic temperatures, the reactor comprising a mixing chamber (12) in which is located, during use, a granular sludge fluidized bed, the reactor further comprising a biofilm chamber (16) fed from the mixing chamber and housing a biofilm colonized pumice-based carrier material, and a separation chamber (18) in fluid communication with the biofilm chamber and in which treated effluent and biogas produced within the reactor are separated.

23 Claims, 6 Drawing Sheets

(56) References Cited

U.S. PATENT DOCUMENTS

2006/0292684 A1* 12/2006 Bentley .................... C02F 3/10
435/262
2008/0156726 A1* 7/2008 Fassbender ................... 210/613

OTHER PUBLICATIONS

Onar et al, "Adsorption of Phosphate onto Pumice Powder", Environmental technologu vol. 14, 1993, pp. 1081-1087.*
Kocadagistan et al, "Wastewater treatment with combined upflow anaerobic fixed-bed and suspended aerobic reactor equipped with a membrane unit", Process Biochemistry vol. 40, 2005, pp. 177-182.*
Loosdrecht et al, "Biological phosphate removal processes", appl Microbiol Biotechnol, 1997, pp. 289-296.*

* cited by examiner

Fig. 6

ANAEROBIC REACTOR FOR WASTEWATER TREATMENT

FIELD OF THE INVENTION

This invention relates to an anaerobic reactor for the treatment of industrial and other wastewaters, preferably at psychrophilic temperatures.

BACKGROUND OF THE INVENTION

Anaerobic digestion (AD) involves the breakdown of complex organic molecules through acetate- and $H_2/CO_2$-mediated methanogenesis to methane ($CH_4$)-containing biogas. The advantages over conventional aerobic treatment systems, of anaerobic waste mineralisation include: a reduction in excess sludge production and the release of methane ($CH_4$), a readily usable fuel, which may be harnessed for external energy uses. Practically all full-scale AD facilities, however, are operated under mesophilic (25-45° C.) conditions (Letting a et al., 1999), the maintenance of which incurs considerable financial costs, using a significant fraction of the biogas energy. The most significant amount of parasitic energy is required to bring the temperature of many wastewaters up to the optimal mesophilic range, since the overwhelming majority of discharges are released for disposal and/or treatment at sub-ambient temperatures. If the need for heating could be removed, AD would be much more economically attractive. In addition, and importantly, AD is currently not widely applied for the treatment of dilute wastewaters, such as sewage—because the energy required to heat the digester often exceeds that recoverable from the biogas. This is a key drawback to conventional AD, which has meant that energy-intensive aerobic technologies, such as Activated Sludge, have been the technology of choice for treatment of municipal and dilute industrial wastewaters for decades.

AD, or methanogenesis, at low temperatures has been described in a variety of natural habitats, however, including tundra and permafrost soils and the sediments of deep-lake ecosystems (Nozhevnikova, 2000), which suggested that low-temperature AD could be a viable target for a novel eco-technology. Psychrophilic, or low-temperature (<20° C.) AD would indeed, if proven feasible, present a highly attractive alternative to conventional operations, offering a low-cost, low-technology methodology for the treatment of many municipal and industrial effluents (Letting a et al., 2001). The application of low-temperature digestion has clear economic benefits in this scenario and this sustainable approach promises to satisfy the socio-economic criteria for the implementation of modern remediation systems on a truly global basis. In addition to this, the possibility of anaerobic mineralisation of environmentally persistent, pharmaceutical or xenobiotic wastewaters (Bioremediation) represents an exciting new commercial application of low-temperature AD.

In addition to carbon removal, wastewater treatment increasingly requires the removal and recovery of phosphate. Globally, phosphate is a diminishing resource, vital for the production of agricultural fertilizers, and there are increasing commercial and legislative drivers requiring its recovery from wastewater. A number of mechanisms for the attenuation of phosphate are known in the art, including the attenuation of phosphate by sorbent materials. Under alkaline conditions, soluble phosphate ions react with calcium to form a sequence of Ca—P phases, for example. Under acidic conditions, phosphate anions ($H_2PO_4^-$, $HPO_4^{2-}$) may react with dissolved $Fe^{3+}$, $Al^{3+}$ and $Mn^{3+}$ to form insoluble hydroxy-phosphate precipitates or may be fixed by insoluble oxides of Fe, Mn, and Al. Anion exchange, which is a pH dependent mechanism may also occur where hydroxyl anions are released and replaced by phosphate ions. With increasing acidity surface charge tends towards a greater positive charge, while increasing pH produces a negatively charged surface. The process involves non-specific electrostatic forces that render the phosphate anions readily exchangeable. The phosphate ion may also replace a structural hydroxyl to form an inner-sphere complex with the oxide surface in ligand exchange. This reaction is also favoured by low pH values. This reaction also binds the phosphate too tightly to allow its readily replacement by other anions. The binding forces involved are covalent bonding, ionic bonding or combination of the two making the recoverability of phosphate very low—a drawback to the use of these materials.

It is therefore an object of the present invention to provide commercially viable low temperature or psychrophilic anaerobic digestion for methane production and phosphate removal from wastewater or other effluents.

SUMMARY OF THE INVENTION

According to a first aspect of the present invention there is provided an anaerobic reactor for treating liquid effluent at psychrophilic temperatures, the reactor comprising a hydroxyl, aluminium, manganese, sodium, potassium, calcium, iron and/or magnesium ion releasing biofilm carrier material for effecting, in use, the biologically-mediated attenuation of phosphate from the effluent.

Preferably, the carrier material comprises a pumice-based material.

Preferably, the reactor comprises a fluid inlet; a mixing chamber supplied by the inlet; a biofilm chamber in fluid communication with the mixing chamber within which the biofilm carrier material is located; and a separation chamber in fluid communication with the biofilm chamber.

Preferably, the reactor comprises a recirculation chamber disposed between the mixing chamber and the biofilm chamber; and at least one recirculation line permitting the recirculation of effluent and/or biogas from the separation chamber to the recirculation chamber.

Preferably, the reactor comprises a unidirectional valve disposed between the mixing chamber and the biofilm chamber and arranged to permit fluid flow from the mixing chamber directly or indirectly into the biofilm chamber.

Preferably, the reactor comprises a unidirectional valve disposed between the biofilm chamber and the separation chamber and arranged to permit fluid flow from the biofilm chamber into the separation chamber.

Preferably, the biofilm carrier material is granular in form and is graded in size, with the largest elements being located closest to the mixing chamber and the smallest elements being located closest to the separation chamber.

Preferably, the reactor comprises mixing means disposed within the mixing chamber to supplement, in use, mixing produced by biogas generated within the mixing chamber.

Preferably, the mixing means comprises an array of baffles located within the mixing chamber.

Preferably, the mixing chamber is operable, in use, as a fluidised granular sludge bed.

Preferably, the reactor comprises a two phase separator in the separation chamber and operable to separate biogas from treated effluent.

Preferably, the reactor comprises a passive vacuum stripper downstream of the separation chamber and operable to strip residual dissolved biogas from the treated effluent.

Preferably, the carrier material has a specific gravity lower than the effluent to be treated in the reactor.

Preferably, the reactor comprises a porous retainer for retaining the carrier material while permitting the flow of effluent around the carrier material.

Preferably, the retainer comprises a cassette shaped and dimensioned for location within the biofilm chamber and operable to retain the biofilm carrier material therein and having a porous base and top in order to permit the flow of fluid through the cassette.

According to a second aspect of the present invention there is provided a method of anaerobic treatment of a liquid effluent at psychrophilic temperatures, the method comprising the step of introducing hydroxyl, aluminium, manganese, sodium, potassium, calcium, iron and/or magnesium ions into the effluent in order to effect biologically-mediated attenuation of phosphate from the effluent.

Preferably, the method comprises, in the step of introducing the ions, causing the release of said ions from a biofilm colonised pumice based carrier material.

Preferably, the method comprises the step of passing the effluent through a fluidised bed section of a reactor that has been inoculated with anaerobic microbial consortia in order to effect methanogenesis of the effluent prior to treating the effluent with the biofilm.

Preferably, the method comprises the step of separating the treated effluent from any biogas generated during the treatment of the effluent.

Preferably, the method comprises maintaining the temperature within the reactor below 25° C., more preferably in the range of between 0° C. and 25° C., and most preferably between 4° C. and 20° C.

Preferably, the method comprises the step of recirculating a quantity of the treated effluent and/or biogas into a recirculation chamber of the reactor.

Preferably, the method comprises the step of immobilising the carrier material within a porous retainer within the reactor.

Preferably, the method comprises the step of effecting mixing of the effluent within the fluidised bed section by directing the effluent past an array of baffles within the fluidised bed section.

As used herein, the term "pumice based material" is intended to mean both naturally occurring pumice and engineering pumice type materials, in particular materials which release hydroxyl, aluminium, manganese, sodium, potassium, calcium, iron and/or magnesium ions as a result of biological activation when the pumice based material is used as a biofilm carrier material for use in the anaerobic treatment of waste water or the like.

As used herein, the term "psychrophilic temperature" is intended to mean a temperature of less than 25° C., and more preferably in the range of between 4° C.-20° C.

DETAILED DESCRIPTION OF THE DRAWINGS

Referring now to the accompanying drawings there is illustrated an anaerobic reactor, generally indicated as 10, for use in the treatment of wastewater at psychrophilic temperatures and in the production of biogas from such wastewater.

Figure 1:
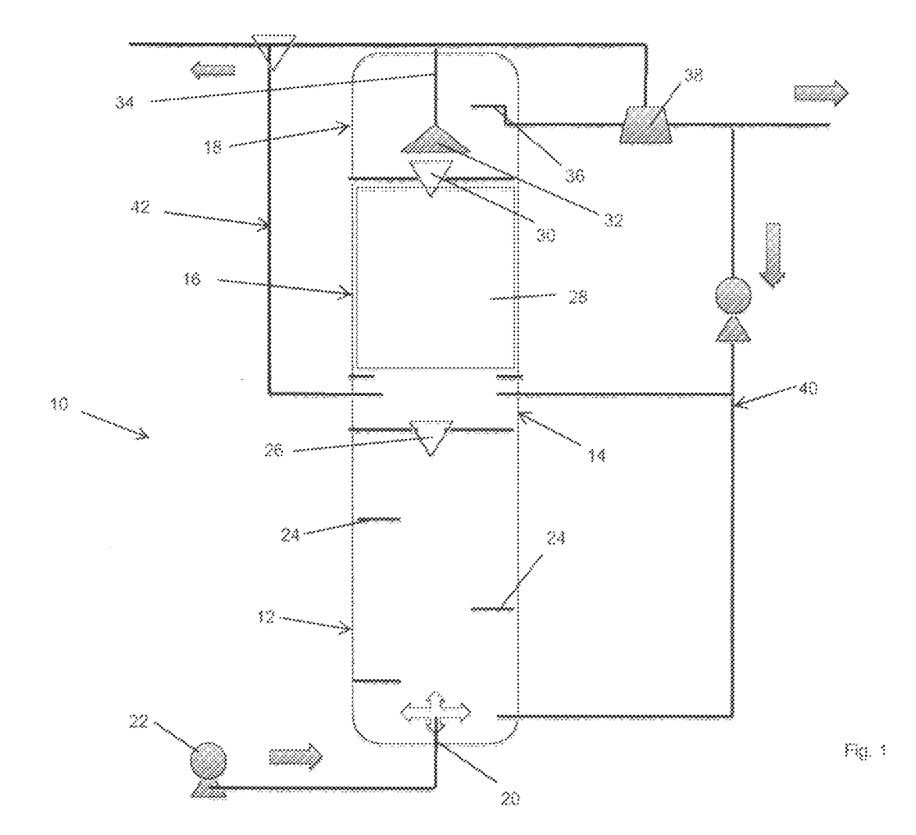
FIG. 1 illustrates a schematic representation of a psychrophilic anaerobic reactor according to an embodiment of the present invention.

The reactor 10 comprises four chambers, a mixing chamber in the form of a fluidised bed chamber 12 located at and forming a base of the reactor 10, a recirculation chamber 14 located directly above the fluidised bed chamber 12 and in fluid communication therewith, a biofilm chamber 16 located above and in fluid communication with the circulation chamber 14, and a separation chamber 18 located above and in fluid communication with the biofilm chamber 16. The reactor 10 further comprises an inlet 20 from which, in use, influent wastewater is supplied to the fluidised bed chamber 12 from an influent distribution device 22.

Located within the fluidised bed chamber 12, during use, is an anaerobic granular sludge that has been inoculated with specialised anaerobic microbial consortia that are capable of anaerobic digestion under psychrophilic conditions (4° C.-20° C.). However the volume of biogas produced as a result of the anaerobic treatment of the wastewater, under psychrophilic conditions, is generally lower than under mesophilic or thermophilic conditions. Thus additional mechanical mixing of the wastewater with the granular sludge within the fluidised bed chamber 12 is beneficial. The reactor 10 is therefore provided with non mechanised mixing means in the form of an array of baffles 24 within the fluidised bed chamber 12, which aid in the mixing of the anaerobic sludge and wastewater without consuming power in order to maintain the efficiency of the reactor 10. It will however be appreciated that alternative non mechanised mixing means may be employed, for example by recirculation of a portion of the effluent from upstream of the fluidised bed chamber 12 in order to effect mixing within the chamber 12.

Once the effluent has percolated upwardly through the fluidised bed chamber 12 it reaches an interface between the fluidised bed chamber 12 and the recirculation chamber 14, which is defined by a one-way valve 26 permitting the flow of both effluent and biogas from the fluidised bed chamber 12 into the recirculation chamber 14. The valve 26 therefore allows the treated effluent and biogas to pass into the recirculation chamber 14, but prevents the flow of effluent/gas in the opposite direction.

The recirculation chamber 14, as will be described in greater detail hereinafter, permits a portion of the treated effluent and/or biogas produced within the reactor 10 to be recirculated in order to permit more accurate process control and sparge cleaning of the biofilm chamber 16. By recirculating effluent and/or biogas into the recirculation chamber 16, as opposed to the fluidised bed chamber, it is possible to avoid excessive sheer forces being applied to the granular sludge within the fluidised bed chamber 12, as will be described in greater detail hereinafter.

From the recirculation chamber 14 the effluent and biogas pass upwardly into the biofilm chamber 16. The biofilm chamber 16 contains, in use, a retainer in the form of a cassette 28 that is porous in order to permit the flow of both the effluent and biogas there through. The cassette 28 contains and constrains a biofilm carrier material (not shown), for example pumice stone or other pumice composites or pumice based materials, which in use is colonised by a biofilm. The pumice based material and associated biofilm promote very significant phosphate removal from wastewater such as sewage. This can be used to reduce the need for chemical or biological phosphate removal processes. The pumice based material may be modified by, for example, adding functional groups such as acetonitriles to introduce an enhanced metal removing capability. The carrier material within the cassette 28 is preferably graded, with the largest elements towards the bottom of the cassette 28 and decreasing in size towards the top of the cassette 28. The effluent and biogas, having passed through the cassette 28 and being treated by the biofilm immobilised therein, pass through a one-way valve 30 into the separation chamber 18.

Figure 4:
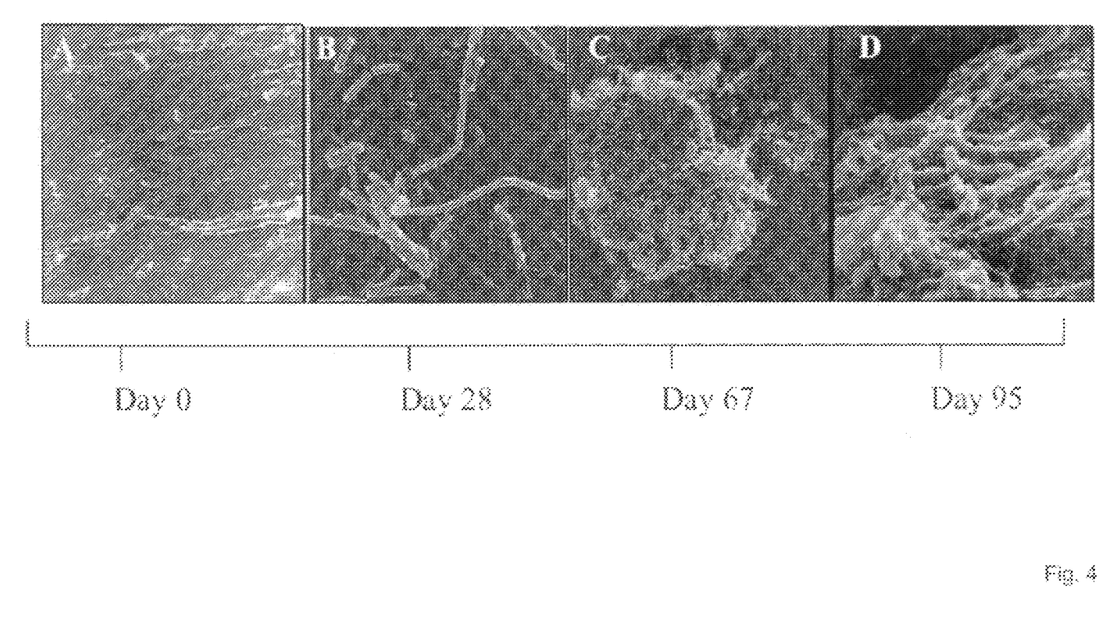
FIG. 4 illustrates the phosphate removal efficiency of uncolonised pumice treating sterile wastewater (Δ); anaerobic biofilm-colonised pumice treating the same wastewater (L); and uncolonised pumice inoculated with a methanogenic consortium from which it can be observed that when biological colonisation of the pumice has taken place, phosphate removal is greatly enhanced and robust during a long-term trial (○)

The present invention has shown that a biological activation of the pumice based material, during low temperature anaerobic digestion, is possible to achieve and that such activation be exploited to achieve significantly improved phosphate removal and is, in fact, responsible for the bulk of the phosphate removal during anaerobic treatment of a variety of wastewaters (e.g. FIG. 4). The biological activation of the pumice based material results in the release of magnesium, calcium and/or potassium ions that are then responsible for the attenuation of the phosphate.

The reactor 10 comprises a two-phase separator 32 located within the separation chamber 18 and operable to separate the treated effluent from the biogas produced within the reactor 10. The separated biogas is withdrawn from the separation chamber 18 via a gas outlet 34 and sent on for cleaning/utilisation/storage. Similarly the effluent is extracted from the separation chamber 18 via an effluent outlet 36. The effluent outlet 36 preferably feeds the treated effluent through a passive vacuum stripper 38 or membrane-based separator (not shown) that is operable to strip any residual dissolved biogas methane from the effluent prior to discharge. This stripped biogas is then fed back into the stream of biogas being drawn from the separation chamber 18 via the gas outlet 34.

Additional process control, and cleaning of the carrier material contained in the cassette 28, is provided by the optional facility to recirculate effluent via a recirculation circuit 40 which can feed the effluent into either the recirculation chamber 14 or the fluidised bed chamber 12 in the capacity of mixing means, depending on the strength and solids content of the wastewater. Similarly biogas withdrawn at the gas outlet 32 may be passed, via a gas recirculation circuit 42, into the recirculation chamber 14 which can efficiently sparge clean the biofilm chamber 16, when necessary, thus having the advantage of avoiding excessive sheer forces being applied to the granular sludge bed within the fluidised bed chamber 12, which thus remains isolated in the fluidised bed chamber 12. The recirculation of both the treated effluent and the biogas may be computer controlled, utilising sensors distributed within the reactor 10 and at the gas outlet 32 and the effluent outlet 34, in order to permit the automated operation of the reactor 10, in particular the recirculation aspect of the reactors operation.

The present invention thus provides a method and apparatus for high rate, low-temperature anaerobic biological treatment of a range of wastewaters. The method and apparatus are preferably operated with hydraulic retention times of 1-12 hours, an organic loading rate of 0.5-35 kg m$^3$ day$^{-1}$, COD removal efficiency up to 99%, under psychrophilic conditions (4-25° C.). The method and apparatus is effective as a system for low-strength (100 mg/l COD upwards) wastewater treatment and for phosphate removal (up to 90%) from wastewater to a standard not previously achievable under anaerobic conditions.

The invention represents an alternative to existing high-rate anaerobic technology for wastewater treatment, which employs bioreactors that must be heated to mesophilic (c. 37° C.) or thermophilic (>45° C.) temperatures. The invention also provides an alternative to existing aerobic processes for the treatment of municipal and industrial wastewaters, such as Activated Sludge Systems and also systems that provide biological phosphorus removal, such as aerobic/anaerobic Sequencing Batch Reactors. The method of the invention can be employed as a stand-alone treatment approach, or in combination with other technologies such as membrane separation or reed-bed (constructed wetlands) depending on the discharge licenses requirements, and is suitable for application at a wide range of scales from 20PE upwards.

Two examples are presented in detail to illustrate the performance characteristics of the low-temperature anaerobic reactor 10, 1) Sewage and 2) phenolic streams.

Figure 3:
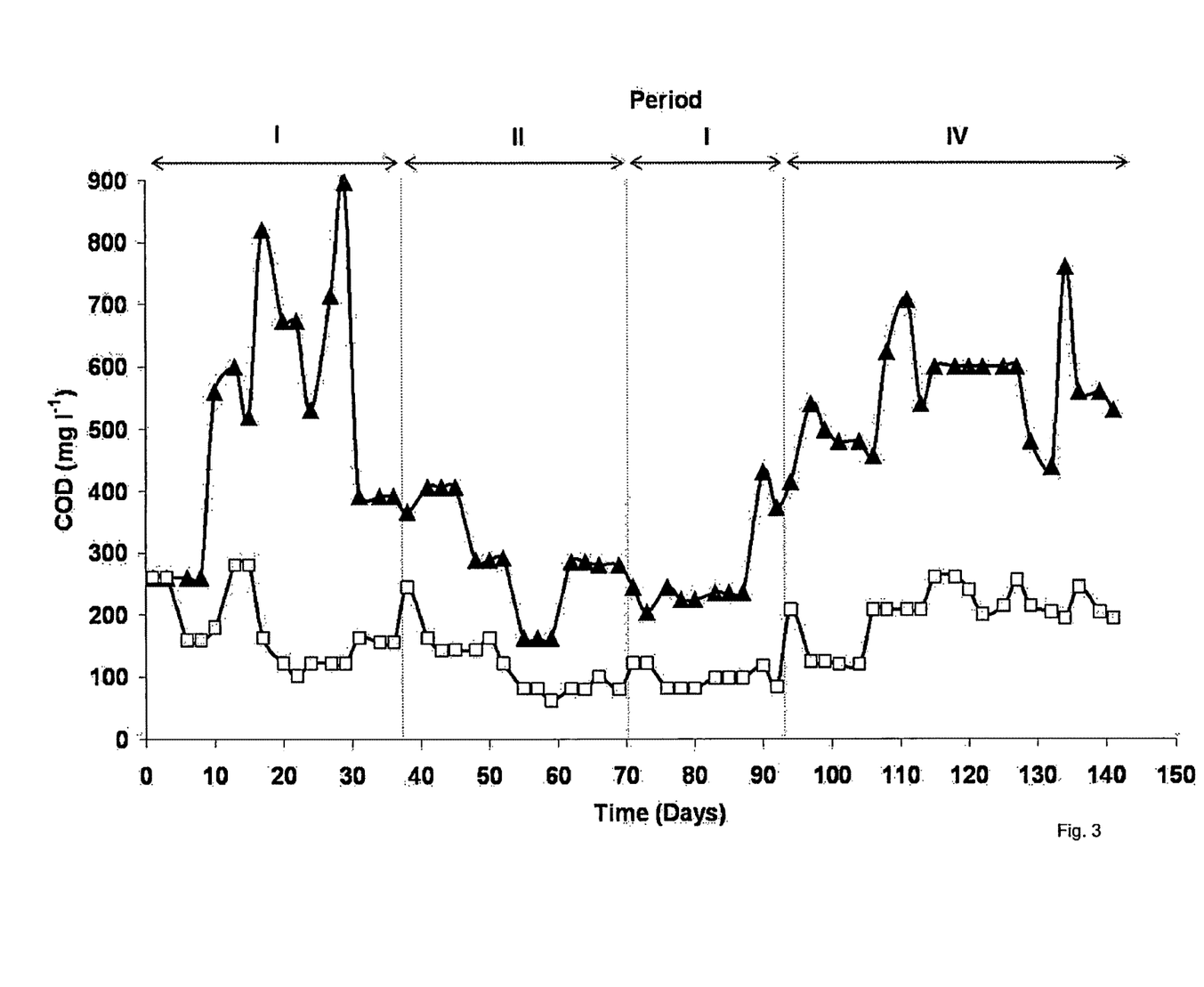
FIG. 3 illustrates COD removal efficiency of Control (■) and Phenol-amended (○) reactors of the invention, and effluent phenol concentration (σ). Applied phenol loading rate: (A) 0.4 kg phenol $m^{-3}$ $d^{-1}$; (B) 0.8 kg phenol $m^{-3}$ $d^{-1}$; (C) 1.2 kg phenol $m^{-3}$ $d^{-1}$. (D) Operating temperature of reduced to 15° C.

A key target for the reactor 10 experimental studies was to demonstrate the use of the invention for the treatment of sewage. Initial long-term trials were carried out on sewage was obtained from the Galway City Council sewage treatment plant at Mutton Island and treated in reactors 10 in a 120-day trial (Case study 2; FIG. 3). Successful treatment of both raw and primary settled sewage, to discharge standards, was achieved by the reactors 10 after a 60-day start-up period.

Case Study 1: Sewage Treatment

Figure 2:
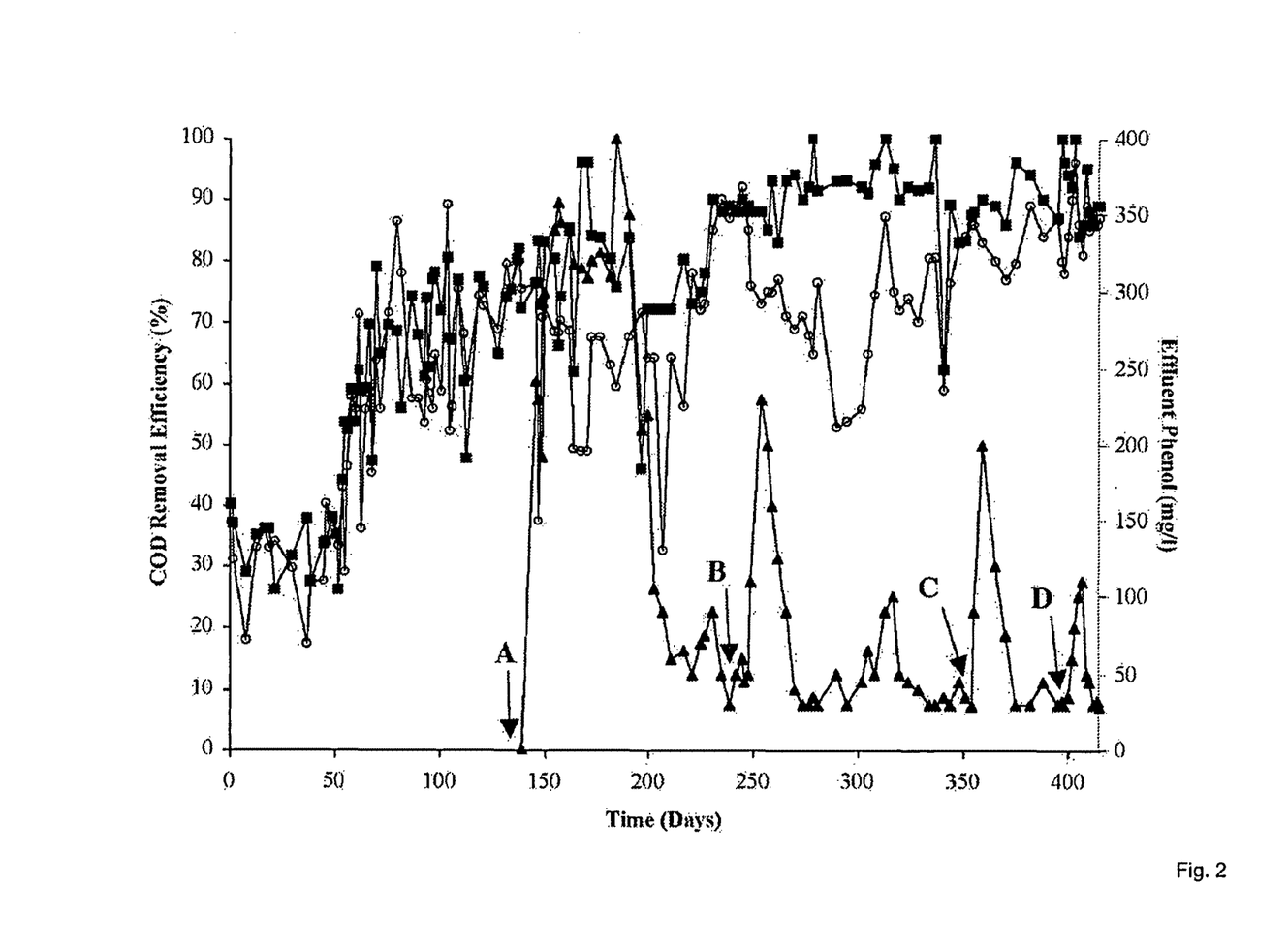
FIG. 2 illustrates COD removal efficiency for high-rate anaerobic treatment of raw sewage at 12° C. for a reactor according to the invention, during the operational periods I-IV, described in Table 1. Influent (σ) and effluent (□)

Raw and primary settled sewage was successfully digested in reactors 10 at both 15 and 12° C., when compared to a 37° C. control (FIG. 2). The applied OLR ranged from 1.5-6 kg COD m$^{-3}$ d$^{-1}$ (Table 1; FIG. 2).

TABLE 1

Operational and performance characteristics of bioreactors R1
treating raw sewage and R2 treating primary settled sewage.

| | Bioreactor | | | | |
|---|---|---|---|---|---|
| | R1 | | | | R2 |
| | Period | | | | |
| | I | II | III | IV | I |
| Days | 0-37 | 38-70 | 71-93 | 94-141 | 0-37 |
| HRT[a] | 24 | 12 | 8 | 6 | 24 |
| VLR[b] | 1 | 2 | 3 | 4 | 1 |
| SLR[c] | 0.05 | 0.1 | 0.15 | 0.2 | 0.05 |
| Influent COD Total (mg l$^{-1}$) | 512.8 ± 207.2 | 291.4 ± 86.0 | 265.4 ± 74.6 | 556 ± 85.2 | 194.1 ± 55.9 |
| Effluent COD Total mg l$^{-1}$) | 175.7 ± 60.2 | 120.8 ± 49.9 | 98.4 ± 17.0 | 200.6 ± 44.0 | 125.3 ± 60.1 |
| COD Removal Efficiency (%) | 57.2 | 58.3 | 60.9 | 63.5 | 36.8 |
| Influent phosphate (mg l$^{-1}$ PO$_4^{3-}$) | 17.9 ± 3.8 | 12.7 ± 4.9 | 11.1 ± 5 | 20.6 ± 4.4 | 5.1 ± 1.3 |
| Effluent phosphate (mg l$^{-1}$ PO$_4^{3-}$) | 4.1 ± 1.4 | 4.1 ± 0.9 | 2.1 ± 0.8 | 4.4 ± 1.9 | 3.5 ± 2 |
| VFA effluent (mg l$^{-1}$ acetic acid) | 0.62 | 0.3 | 0.32 | 1.47 | 0.53 |

| | Bioreactor R2 | | | |
|---|---|---|---|---|
| | Period | | | |
| | II | III | IV | V |
| Days | 38-70 | 71-93 | 94-112 | 113-149 |
| HRT[a] | 12 | 8 | 6 | 3 |
| VLR[b] | 2 | 3 | 4 | 8 |
| SLR[c] | 0.1 | 0.15 | 0.2 | 0.4 |
| Influent COD Total (mg l$^{-1}$) | 155.9 ± 22.6 | 100.8 ± 24.3 | 157.2 ± 84.9 | 277.9 ± 27.8 |
| Effluent COD Total mg l$^{-1}$) | 86.3 ± 30.5 | 65.2 ± 11.1 | 111.8 ± 70.6 | 145.9 ± 36.4 |
| COD Removal Efficiency (%) | 45.6 | 32.7 | 31.7 | 47.1 |
| Influent phosphate (mg l$^{-1}$ PO$_4^{3-}$) | 4.7 ± 2.2 | 2.1 ± 1.7 | 3.8 ± 1.6 | 9.8 ± 3.3 |
| Effluent phosphate (mg l$^{-1}$ PO$_4^{3-}$) | 2.9 ± 1.9 | 0.6 ± 0.6 | 1 ± 1 | 4.2 ± 2.4 |
| VFA effluent (mg l$^{-1}$ acetic acid) | 0.38 | 0.28 | 0.68 | 1.78 |

All values are the phase mean ± phase standard deviation;
[a]Hydraulic retention time (h);
[b]Volumetric loading rate (m$^3_{Wastewater}$ m$^{-3}_{Reactor}$ d$^{-1}$);
[c]Sludge loading rate (m$^3_{Wastewater}$ kg[VSS]$^{-1}$ d$^{-1}$);

The performance of the reactor 10 was robust and stable during the trial and resulted in a COD removal efficiency meeting national (Irish) discharge standards.

Case Study 2: Phenolic Wastewaters

Phenol was successfully digested in the reactor 10 at both 18° C. and 15° C. (FIG. 2), thus broadening the range of discharges that may be recognised as suitable for low-temperature anaerobic biological treatment. The applied OLR was 5 kg COD m$^{-3}$ d$^{-1}$, while a phenol loading rate of 1.2 kg phenol m$^{-3}$ d$^{-1}$ was achieved, with up to 97.5% phenol removal (FIG. 3).

An average start-up period of 60 days was observed for the reactor 10 treating both the real and synthetic wastewaters—the previous start-up times reported for psychrophilic anaerobic bioreactors was 120 days—suggesting the reactor 10 and inocula represent a significant advance on the state of the art in anaerobic treatment.

The reproducibility of the low-temperature anaerobic digestion of the present invention was illustrated by the parallel performance of replicated reactors. During a trial with five replicated reactors, performance parameters, such as hydraulic retention times (HRT; 1.5-48 h), organic loading rates (OLR; 1.5-25 kg COD m$^{-3}$ d$^{-1}$) and volumetric loading rates (0.2-5 m$^3$ m$^{-3}$ d$^{-1}$) were varied with highly reproducible and robust performance. The performance of the reactor 10 indicated satisfactory COD removal from both low- and medium-strength wastewater from the food-processing industry, from sewage and from recalcitrant streams. Furthermore, satisfactory COD removal efficiencies were achieved for the digestion of dilute and high-strength wheybased wastewaters. VFA accumulation was not problematic, in general, but increased levels of propionate and acetate in digester effluents was considered indicative of reactor stresses initiated by perturbations applied to the experiments (data not shown).

The formation of immobilized microbial biofilm under psychrophilic conditions was observed in the reactor 10 while higher COD removal efficiencies were consistently recorded for the reactors 10 than for EGSB and fully-packed AF controls. The upper biofilm chamber 16 of the reactor 10 offered a 'polishing' step for the degradation of acidified wastewater from the initial upflow stages of the fluidised bed chamber 12. This was most obvious in the treatment of recalcitrant wastewaters, when residual chlorinated phenols, produced by trichlorophenol degradation in fluidised bed chamber 12 of the were successfully degraded by de novo biofilm formed in the upper pumice-packed biofilm chamber 16. In addition, the pumice based material and biofilm provides an excellent means of phosphate attenuation from wastewaters with phosphate removal ranging between 60-80% during the trial referred to in Table 1. This is a significant advantage to the present invention and is unique with respect to anaerobic bioreactors.

In addition, the pumice based material and biofilm provide an excellent means of phosphate attenuation from wastewaters with phosphate removal ranging between 60-80% during the trial referred to in Table 1. The mechanism of action relates to the use of anaerobic biofilms to mediate and significantly enhance the phosphate removal capacity of porous, sorbent materials, such as pumice stone through:
  (i) The interaction between the anaerobic biofilm cells and the surface, which results in surface activation—specifically the release of hydroxyl anions and aluminium, manganese, sodium, potassium, calcium, iron, magnesium and/or other cations (FIG. 4);
  (ii) Removal of volatile fatty acids in the wastewater by living anaerobic biofilms, which increases the pH within the biofilm and causes calcium phosphate and other cation-phosphate precipitates to form within the biofilm;
  (iii) The provision of continuously regenerating polysaccharide matrix material by the growing biofilms, which increases the effective surface area for phosphate attenuation.

Figure 5:
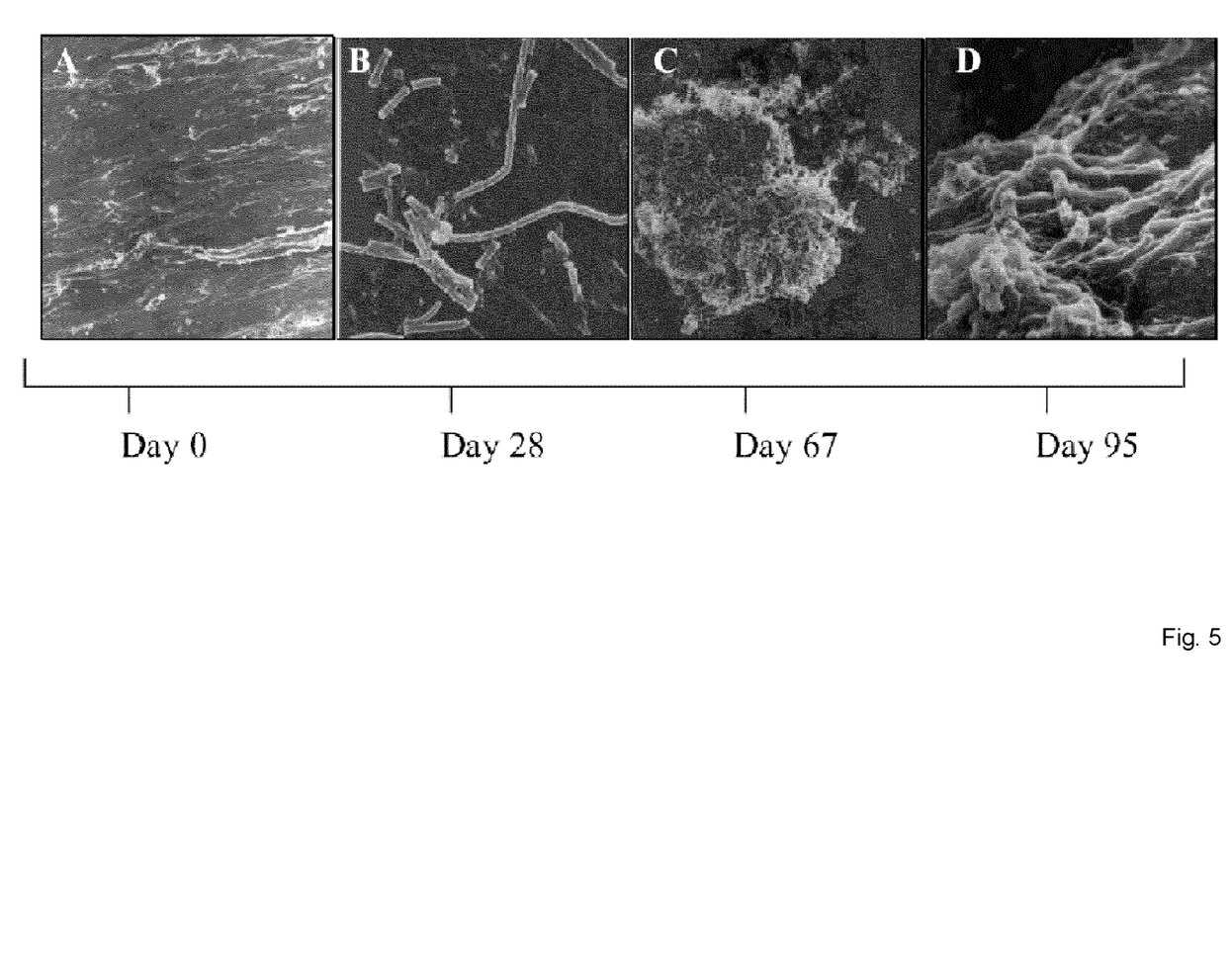
FIG. 5 illustrates electron micrographs showing the temporal microbial colonisation of carrier material under psychrophilic conditions in the reactor of the present invention.
Figure 6:
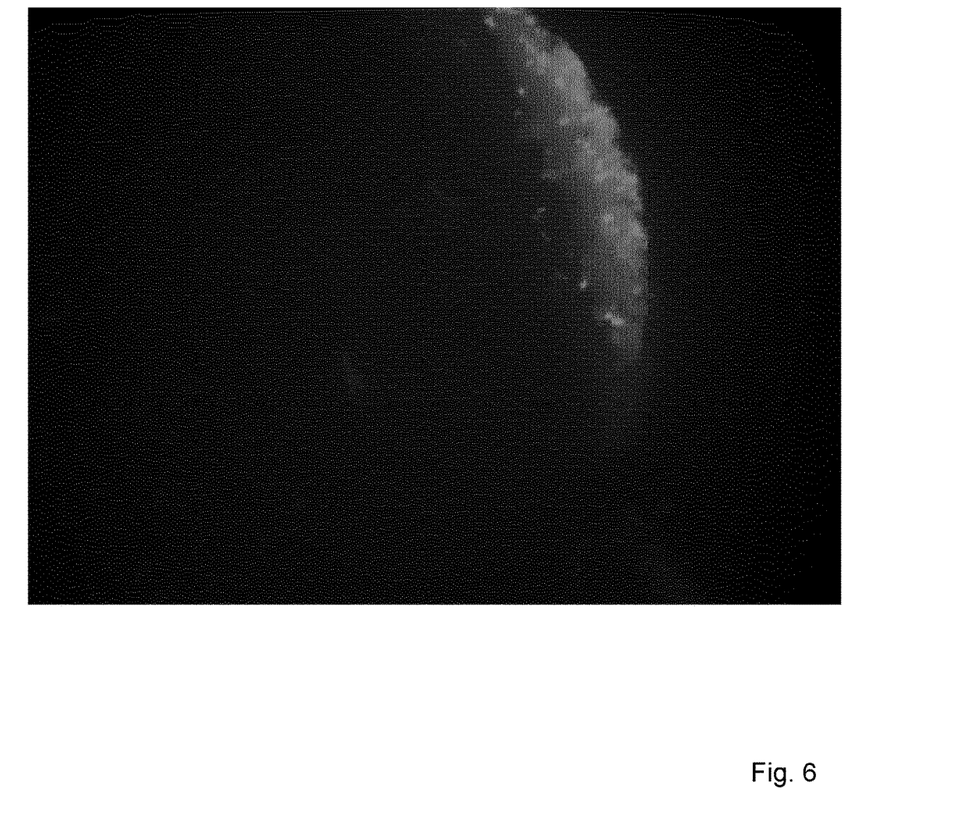
FIG. 6 is a photograph illustrating the formation of poly-phosphate precipitates in the biofilm attached to pumice material in the anaerobic reactor according to the present invention.

FIG. 4 illustrates the result of an experiment, which demonstrates the effect of the biologically-mediated phosphorus removal compared to the normal adsorption and ion-exchange processes occurring in non-biologically activated pumice. FIG. 5 illustrates the biofilm formed in the present reactor, while FIG. 6 is a photograph of polyphosphate precipitates, which have formed in the matrix of a biofilm attached to a pumice particle in the anaerobic reactor 10.

It is the novel combination of fluidised bed with enhanced mixing through non-mechanical means, an appropriate methanogenic inoculum, the ability to recycle effluent through the fluidized bed section before the liquid provided by the recirculation chamber and the action of the pumice based material in the biofilm chamber that allows the efficient operation of the reactor 10 for psychrophilic anaerobic digestion, including for the treatment of low-strength wastewaters and the removal of phosphate.

Specific Methanogenic Activity (SMA) collated at 15° C. for the reactor sludges were higher than those recorded at 37° C. for the seed sludges, revealing satisfactory development of the methanogenic and acetogenic activity of the microbial communities through low-temperature reactor cultivation. Evidence of psychrophilic Hydrogen-, butyrate- and propionate-catabolising communities was obtained from SMA assays in biomass from the very longest trials.

Importantly, 50% inhibition concentrations ($IC_{50}$ values) for a variety of potential toxicants were comparable, or indeed higher, for the reactor 10 than those reported previously for mesophilic sludges. This is a further indication that the reactor 10 is robust and suitable for treatment of a wide variety of wastewaters, including those containing toxic or recalcitrant compounds.

The reactor 10 of the present invention therefore provides the following advantages:

The method and reactor 10 of the present invention employ anaerobic microbial consortia to remove pollutants from the wastewater. The reactor 10 requires no aeration and, in fact, the process is a net energy producer as approximately 80-90% of the energy contained in the wastewater organics is conserved in the methane-rich biogas.

Conventional anaerobic digestion results in net waste sludge production of <<0.1 kg dry biomass/kg BOD removed. The reactor 10 of the present invention, because it is operated at lower-temperatures than conventional AD and microbial growth is therefore slower, typically results in net sludge production of <<0.02 kg dry biomass/kg BOD removed. Furthermore, anaerobic sludge is, unlike aerobic sludge, a valuable product as a source of seed inoculum.

The reactor 10 is operated at ambient temperatures, does not require heating and functions highly efficiently at wastewater temperatures of as low as 3° C. The year round temperature of sewage in Ireland is 12±1° C. Most industrial discharges are between 15° C.-18° C. Therefore there is a net positive energy balance by using the present invention to treat many low-strength wastewaters, unsuitable for conventional AD. Heating accounts for more than 80% of the operating costs of conventional high-rate AD and, consequently, the present invention represents an extremely energy and cost-effective approach.

The method of the invention embodies a single stage treatment process, and the reactor 10 used to carry out said method has a large height:diameter ratio. This means that the spatial footprint of the reactor 10 is smaller, and the process monitoring far simpler, than high-rate aerobic approaches.

The 4-chamber configuration of the reactor 10 and the presence of the carrier material, results in effluent quality far exceeding that reported for conventional AD systems. In particular the use of a pumice based carrier material promotes significant phosphate removal from sewage or the like. The present invention as a single-step treatment process discharge standards for treated domestic sewage, for example, to marine environments, and merely requires a passive polishing step, such as a constructed wetland to complete the treatment process for discharge to more sensitive environments.

The system and method of the present invention:

Achieves high-rate and highly efficient anaerobic wastewater treatment (Hydraulic retention times 1-12 hours); Organic loading rate 0.5-35 kg $m^3$ $day^{-1}$; COD removal efficiency up to 99%) under psychrophilic conditions (4-25° C.);

Is effective as a system for low-strength (100 mg/l COD upwards) wastewater treatment; and Achieves phosphate removal (up to 90%) from wastewater to a standard not previously possible under anaerobic conditions.

The invention claimed is:

1. An exclusively anaerobic single reactor for treating liquid effluent at psychrophilic temperatures, the reactor comprising an on releasing biofilm carrier material selected from the group consisting of hydroxyl, aluminium, manganese, sodium, potassium, calcium, iron and magnesium and colonized by an anaerobic bacteria for the biological attenuation of phosphate from the effluent through the formation of polyphosphate.

2. An anaerobic reactor according to claim 1 in which the carrier material comprises a pumice-based material.

3. An anaerobic reactor according to claim 1 comprising a fluid inlet; a mixing chamber supplied by the inlet; a biofilm chamber in fluid communication with the mixing chamber within which the biofilm carrier material is located; and a separation chamber in fluid communication with the biofilm chamber.

4. An anaerobic reactor according to claim 3 comprising a recirculation chamber disposed between the mixing chamber and the biofilm chamber; and at least one recirculation line permitting the recirculation of effluent and boas from the separation chamber to the recirculation chamber.

5. An anaerobic reactor according to claim 3 comprising a unidirectional valve disposed between the mixing chamber and the biofilm chamber and arranged to permit fluid, flow from the mixing chamber directly or indirectly into the biofilm chamber.

6. An anaerobic reactor according to claim 3 comprising a unidirectional valve disposed between the biofilm chamber and the separation chamber and arranged to permit fluid flow from the biofilm chamber into the separation chamber.

7. An anaerobic reactor according to claim 3 in which the biofilm carrier material is granular in form and is graded size, with the largest elements being located closest to the mixing chamber and the smallest elements being located closest to the separation chamber.

8. An anaerobic reactor according to claim 3 comprising baffles disposed within the mixing chamber to supplement mixing produced by biogas generated within the mixing chamber.

9. An anaerobic reactor according to claim 3 in which the mixing chamber is operable, in use, as a fluidised granular sludge bed.

10. An anaerobic reactor according to claim 3 comprising a two phase separator in the separation chamber and operable to separate biogas from treated effluent.

11. An anaerobic reactor according to claim 3 comprising a passive vacuum stripper downstream of the separation chamber and operable to strip residual dissolved biogas from the treated effluent.

12. An anaerobic, reactor according to claim 1 in which the carrier material has a specific gravity lower than the effluent to be treated in the reactor.

13. An anaerobic reactor according to claim 1 comprising a porous retainer for retaining the carrier material while permitting the flow of effluent around the carrier material.

14. An anaerobic reactor according to claim 13 in which the retainer comprises a cassette shaped and dimensioned for location within the biofilm chamber and operable to retain the biofilm carrier material therein and having a porous base and top in order to permit the flow of fluid through the cassette.

15. A method of exclusively anaerobic treatment of a liquid effluent at psychrophilic temperatures with a single reactor, the method comprising the step of introducing ions selected from the group consisting of hydroxyl, aluminium, manganese, sodium, potassium, calcium, iron and magnesium into the effluent to effect biologic attenuation of phosphate from the effluent through the formation of polyphosphate.

16. A method according to claim 15 comprising, in the step of introducing the ions, release of said ions from a biofilm colonised pumice based carrier material.

17. A method according to claim 15 comprising the step of passing the effluent through a fluidised bed section of a reactor that has been inoculated with anaerobic microbial consortia prior to treating the effluent with the biofilm.

18. A method according to claim 15 comprising the step of separating the effluent from any biogas generated during the treatment of the effluent.

19. A method according to claim 15 comprising maintaining the temperature within the reactor below 25° C.

20. A method according to claim 15 comprising the step of recirculating a quantity of the effluent and biogas into a recirculation chamber of the reactor.

21. A method according to claim 15 comprising the step of immobilising the carrier material within a porous retainer within the anaerobic reactor.

22. A method according to claim 17 comprising the step of mixing of the effluent within the fluidised bed section by directing the effluent past an array of baffles within the fluidised bed section.

23. An exclusively anaerobic single reactor for treating liquid effluent at psychrophilic temperatures, the reactor comprising an ion releasing biofilm carrier material selected from the group consisting of hydroxyl, aluminium, manganese, sodium, potassium, calcium, iron and magnesium and colonized by an anaerobic bacteria for the biological attenuation of phosphate from the effluent through the formation of polyphosphate; the single reactor comprising four chambers comprising a mixing chamber; a biofilm chamber in fluid communication with the mixing chamber within which the biofilm carrier material is located; a separation chamber in fluid communication with the biofilm chamber; a recirculation chamber disposed between the mixing chamber and the biofilm chamber; and at least one recirculation line permitting the recirculation of effluent acid/or biogas from the separation chamber to the recirculation chamber.

* * * * *